R. C. Wrenn's Hemp-Dropper.

No. 75,103

PATENTED MAR 3 1868

Witnesses:
Theo Insche
Wr Trewin

Inventor:
R. C. Wrenn
Per Munn
Attorneys

United States Patent Office.

R. C. WRENN, OF WAVERLY, MISSOURI.

Letters Patent No. 75,103, dated March 3, 1868.

IMPROVEMENT IN HEMP-HARVESTERS.

The Schedule referred to in these Letters Patent and making part of the same.

TO ALL WHOM IT MAY CONCERN:

Be it known that I, R. C. WRENN, of Waverly, in the county of La Fayette, and State of Missouri, have invented a new and improved Hemp-Dropping Attachment to Reapers; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
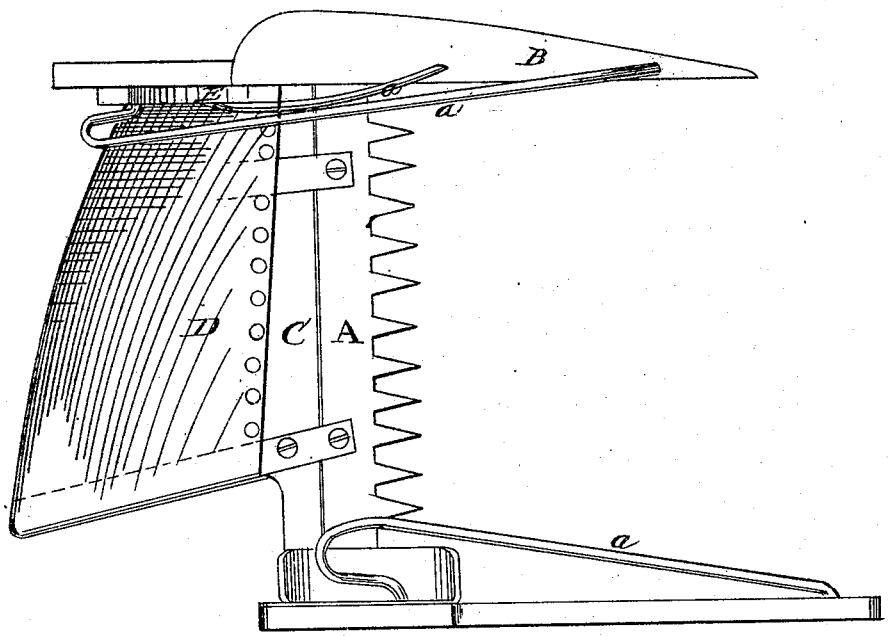
Figure 1 is a top view of my improved hemp-dropping attachment to a reaper or mower.
Figure 2:
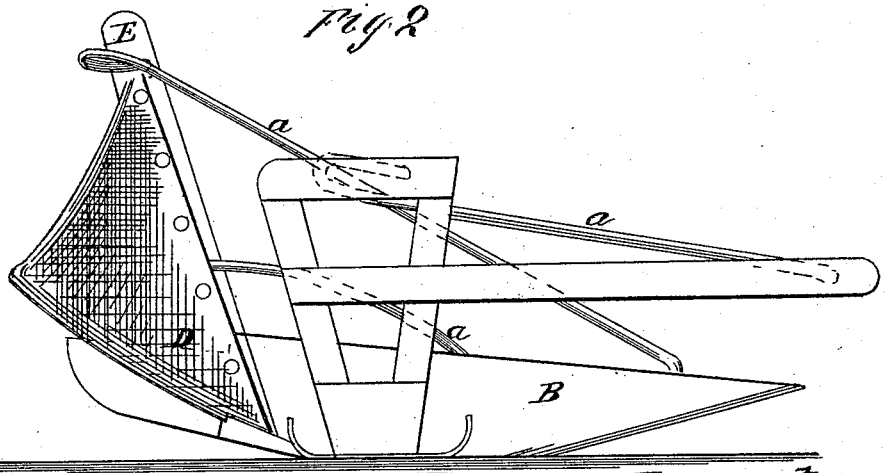
Figure 2 is a side view.

The object of this invention is to remove the cut hemp, as the reaper moves forward, out of the way of the machine and the horses for the passage of the reaper on the next round, and thus prevent the tangling of the hemp-stalks.

The improvement consists in an attachment to any reaper or mower for cutting hemp, and the advantage is not only the keeping the hemp in better order, but a great economy, as it will save the labor of three men, now required for the purpose of removing the cut hemp out of the way of the machine.

A represents the sickle-bar of an ordinary reaping-machine, and B the divider, the rest of the machine being generally constructed as usual. Immediately behind the cutter-bar, and flush with it, is a flat board, C, to which is attached a sheet-iron or other suitable apron, D, which is secured to the board at its lower edge, while its side is fastened to an upright, E, made fast to the divider B. The apron D is made curving, like the mould-board of a plough, being so shaped as to turn the hemp-stalks from the side of the divider, and discharge them in the rear of the machine, away from the uncut hemp, so as to leave a clear space next to it for the passage of the reaper and the horses on the next round. On both sides of the machine are guide-bars, $a\ a$, which gather and compress the hemp-stalks as they are cut and fall back behind the cutter-bar. A seat and support for the feet will be provided for the operator while he divides the hemp with a fork, and helps it off in bundles.

Having described my invention, I claim as new, and desire to secure by Letters Patent—

In combination with a machine for cutting hemp, the curved apron D, placed behind the cutter-bar, constructed, arranged, and operating substantially as described.

R. C. WRENN.

Witnesses:
JAMES M. PELOT,
W. B. McFARLAND & CO.